United States Patent [19]
Ribka et al.

[11] 3,985,725
[45] Oct. 12, 1976

[54] QUINOLINO-AZO-ACETO-ACETYLAMINOBENZIMIDAZOLONE PIGMENTS FAST TO HEAT

[75] Inventors: Joachim Ribka, Offenbach (Main); Wolfgang Rieper, Frankfurt am Main; Reinhard Zunker, Kelkheim, Taunus, all of Germany

[73] Assignee: Hoechst Aktiengesellschaft, Frankfurt am Main, Germany

[22] Filed: Mar. 17, 1975

[21] Appl. No.: 558,955

Related U.S. Application Data

[63] Continuation of Ser. No. 320,572, Jan. 2, 1973, abandoned.

[30] Foreign Application Priority Data

Jan. 3, 1972 Germany............................ 2200112

[52] U.S. Cl............................. 260/155; 106/288 Q; 106/308 Q; 260/37 R; 260/40 R; 260/42.21; 260/288 R; 260/307 C; 428/446; 428/480; 428/492; 428/500; 428/537
[51] Int. Cl.².................... C09B 29/36; D06P 1/08; D06P 3/24; D06P 3/52
[58] Field of Search........................... 260/155, 157

[56] References Cited
UNITED STATES PATENTS

| | | | |
|---|---|---|---|
| 3,109,842 | 11/1963 | Schilling et al. | 260/157 |
| 3,113,938 | 12/1963 | Nakaten et al. | 260/154 |
| 3,119,808 | 1/1964 | Buckley et al. | 260/155 |
| 3,124,565 | 3/1964 | Schilling et al. | 260/157 |
| 3,137,685 | 6/1964 | Buckley et al. | 260/155 |

*Primary Examiner*—Floyd D. Higel
*Attorney, Agent, or Firm*—Curtis, Morris & Safford

[57] ABSTRACT

Monoazo dyestuffs of the formula

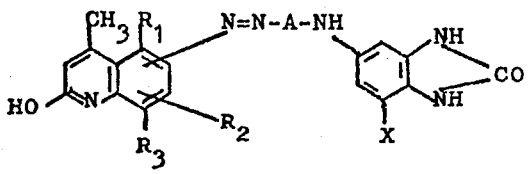

wherein $R_1$, $R_2$ and $R_3$ are identical or different and are hydrogen, alkyl or alkoxy, preferably having 1 to 2 carbon atoms, or halogen, especially chlorine, X is hydrogen or halogen, preferably chlorine and A is acetoacetyl or and a process for preparing them by coupling diazotized amines of the general formula

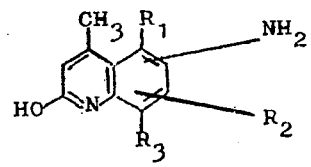

with coupling components of the formula

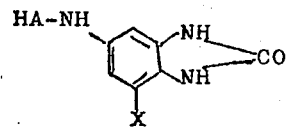

where $R_1$, $R_2$, $R_3$, X and A have the above meaning. These new pigments may be used for dyeing and printing of material or synthetic materials. They have good fastness properties, especially an improved fastness to heat.

5 Claims, No Drawings

QUINOLINO-AZO-ACETO-ACETYLAMINOBENZIMIDAZOLONE PIGMENTS FAST TO HEAT

This is a continuation, of application Ser. No. 320,572, filed Jan. 2, 1973, now abandoned.

The present invention relates to novel, valuable water-unsoluble monoazo pigments of the formula

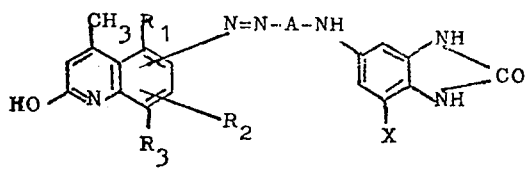

wherein $R_1$, $R_2$ and $R_3$ arl identical or different and are hydrogen, alkyl or alkoxy, preferably having one to two carbon atoms, or halogen, especially chlorine, X is hydrogen or halogen, preferably chlorine, and A is acetoacetyl as well as to a process for preparing them, which comprises coupling diazotized amines of the formula

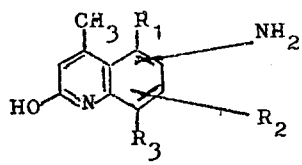

with coupling components of the general formula

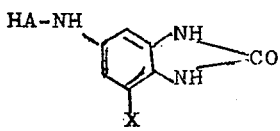

wherein $R_1$, $R_2$, $R_3$, X and A have the meanings given above.

The amines used as diazo components can be prepared according to known methods; for example the 6-amino-4-methylcarbostyrile is obtained by reacting anilines substituted accordingly, with diketene, subsequently cyclicizing the N-acetoacetylarylide with concentrated sulfuric acid to give the 4-methylcarbostyriles, and are superior as dyestuffs for polyolefins, polyesters, rubber and silicone resins. The nitration products of which lead to the 6-nitro-compounds which are converted into the 6-amino-4-methylcarbostyriles by catalytic reduction.

The 7-amino-4-methylcarbostyriles used are obtained in an easier way according to a process described in German Pat. No. 958,647. According to the process mentioned m-phenylene-diamines which may be substituted by alkyl or alkoxy groups or by halogen are converted with diketene into the acetoacetylamino compounds which cyclicize without any further isolation, under neutral or slightly acidic conditions, to give the 7-amino-4-methylcarbostyriles.

The coupling components are prepared according to known methods by reacting a 5-aminobenzimidazolone either with diketene or with 2-hydroxynaphthalene-3-carboxylic acid chloride.

The pigments according to the invention are prepared according to known processes by coupling the diazotized amines with the coupling components in an aqueous medium, if desired, in the presence of non-ionogenic, anion-active or cation-active dispersing agents. The coupling reaction may be carried out completely or partly in organic solvents such as methanol or isopropanol.

It is frequently expedient to subject the pigments thus-obtained to an after-treatment in order to obtain the full color intensity and a particularly favorable crystal structure. For example, for this purpose the moist or dry and ground pigments are heated for some time under reflux or under pressure to elevated temperatures in pyridine, dimethyl formamide or other organic solvents such as dimethyl sulfoxide, alcohols chlorobenzene, dichlorobenzene, glacial acetic acid, quinoline, glycol or nitrobenzene. In some cases the conversion into a particularly favorable crystal structure is achieved by heating with water, if desired with pressure, if desired under addition of dispersing agents and, if desired, with addition of organic solvents, for example of the afore-mentioned type.

The water insoluble pigments thus-obtained are very suitable for dyeing polystyrene, polyolefins such as for example polyethylene or polypropylene, polyacryle compounds, polyvinyl acetate, polyesters, rubber, caseine and silicone resins.

They are further suitable for preparing printing pastes, lacquers and dispersion pastes, furthermore, for pigment printing on a substrate, especially on a textile fibre, as well as on other materials having a plane surface such as paper.

The pigments may also be used for other purposes, for example in a finely divided form for dyeing rayon of viscose or cellulose ethers or esters, polyamides, polyurethanes or polyglycol terephthalates in the spinning mass or for coloring paper.

In the mentioned media the pigments show very good fastnesses to light, weather and migration — and have as a particular characteristic a fastness to heat considerably improved as compared with monoazo pigments hitherto known. Furthermore, they are color-intense, and in many cases pure shades are obtained. They are resistant to the influence of chemical products, acids and alkalis.

Whereas monazo pigments hitherto described including the next comparable azo pigments of German Pat. No. 1,278,039 are fast to heat only up to 240° C, the monoazo pigments of the present invention are generally fast to heat up to 300° C, in some cases even up to 320° C. Therefore, on account of this property, these dyestuffs may be incorporated into plastics such as polyolefins, even at higher temperatures.

The following Examples illustrate the invention. Parts and percentages are by weight unless stated otherwise. The relationship between parts by weight and parts by volume is as "grams" to "cubic centimeter".

EXAMPLE 1

20.86 Parts of 7-chloro-6-amino-2-hydroxy-4-methylquinoline were stirred over night in 100 parts by volume of water with 90 parts by volume of 5N hydrochloric acid. The mixture was diluted with ice water to 600 parts by volume of ice and diazotized at 8°–12° with 22 parts by volume of 5N sodium nitrite solution. Stirring was continued for 1 hour, the excess of nitrite was destroyed with amidosulfonic acid and the whole was clarified.

28.0 Parts of 7-chloro-5-acetoacetylamino-benzimidazolone were suspended in 200 parts by volume of water and dissolved by addition of 18 parts by volume of a 33% aqueous sodium hydroxide solution.

In the coupling vessel 500 parts by volume of water, 25 parts of phosphoric acid, 30 parts by volume of a 33% aqueous sodium hydroxide solution and 10 parts by volume of a 10% aqueous solution of the reaction product of 1 mol of stearylic alcohol and 20 mols of ethylene oxide were prepared. AT 10° to 15° C the clarified solutions of the diazo and coupling component were simultaneously poured onto this buffer mixture, whereby it had to be insured that a small excess of the coupling component was continuously available. When coupling was finished the whole mixture was heated to 95° C by introducing steam; this temperature was maintained for 30 minutes, the pigment was suction-filtered and washed with water.

The moist press-cake was filled into a pressure vessel and the content of water was determined with a sample. The whole was filled up with water until the press-cake contained 300 parts of water, 300 parts by volume of ethanol were added and the mixture was heated for 4 hours under pressure to 130° C. After cooling the pigment was suction-filtered, washed with water, dried and ground.

The pigment thus-obtained of the formula

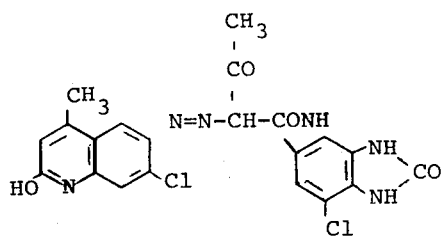

provided — when incorporated into polyethylene, polyvinyl chloride, a lacquer, a printing paste or a spinning solution — pure green-ish yellow dyeings having a good fastness to migration and to light and a very good fastness to heat.

EXAMPLE 2

11.2 Parts of 6-amino-5-chloro-4,8-dimethyl-2-hydroxyquinoline were dissolved in 45 parts by volume of 5N hydrochloric acid by heating. By addition of 200 parts by volume of ice/water, a thin suspension of the amine was obtained which was diazotized by introducing 11.5 parts by volume of a 5N sodium nitrate solution. Stirring was continued for 1 hour, the excess of nitrite was destroyed with amidosulfonic acid and the whole was clarified.

14.3 Parts of 7-chloro-5-acetoacetyl amino-benzimidazolone were dissolved in 100 parts by volume of water and 10 parts by volume of a 33% aqueous sodium hydroxide solution and clarified into the coupling vessel. After addition of 10 parts by volume of a 10% aqueous solution of the reaction product of 1 mol of stearylic alcohol and 20 mols of ethylene oxide, the coupling component was reprecipitated by adding quickly 9 parts by volume of glacial acetic acid. The diazonium salt solution was added slowly to the suspension thus obtained, the pH value being maintained at 5.0 to 6.0 by simultaneously addition of 4N sodium acetate solution. When the coupling was finished, the reaction mixture was heated to 95° C by introducing steam, this temperature was maintained for one hour, the pigment was suction-filtered hot and washed with hot water.

The moist press-cake was filled into a pressure vessel and the content of water was determined with a sample. The whole was filled up until the press-cake contained 150 parts of water, 150 parts by volume of ethanol were added and the mixture was heated for 4 hours to 125° C. After cooling, the pigment was suction-filtered, washed with water, dried and ground.

the monoazo pigment thus obtained of the formula

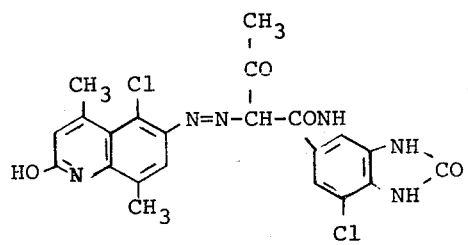

provided — when incorporated into poly-olefins, for example polyethylene, polyvinyl chloride, a lacquer, a printing ink or a spinning solution — pure yellow dyeings which have a very good fastness to light and to migration; the fastness to heat of the dyeings is perfect up to 320° C.

EXAMPLE 3

22.5 Parts of 6-amino-5-chloro-4,8-dimethyl-2-hydroxyquinoline were diazotized according to Example 2. The diazonium salt solution obtained was clarified and mixed with 10 parts of an aqueous solution of 17.2 parts of sodium acetate and 10 parts of glacial acetic acid. A clarified solution of 31.9 parts of 5-(2',-3'-oxynaphthoylamino)-benzimidazolone in 400 parts by volume of water, 125 parts by volume of 2N sodium hydroxide solution and 2 parts of a condensation product of 1 mol of stearylic alcohol and 20 mols of ethylene oxide was poured into this solution. When coupling was finished the pigment obtained was suction-filtered and washed. The press-cake obtained was heated as indicated in the Examples 1 and 2, for 5 hours to 150° C in a pressure vessel in a 50% aqueous isopropanol. Then the pigment was filtered, washed and dried.

The pigment obtained of the formula

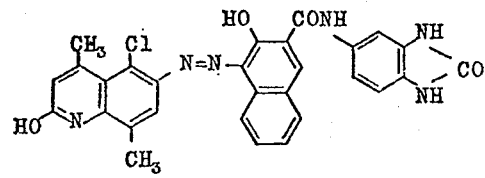

provided — when incorporated into a lacquer, a printing paste, polyvinyl chloride or a spinning solution — pure bluish-red dyeings having a high fastness to light, an excellent fastness to overvarnishing and a very good fastness to migration and to heat.

The following Table contains a number of further components to be used according to the invention as well as the shades of the graphic prints of the pigments prepared therefrom in substance

| Diazo component | Coupling component | Shade |
|---|---|---|
| [structure: 4,5,8-trimethyl-6-amino-2-hydroxyquinoline] | 5-acetoacetylaminobenzimidazolone | yellow |
| " | 7-chloro-5-acetoacetylamino-benzimidazolone | yellow |
| " | 5-(2'-hydroxy-3'-naphthoyl-amino)-benzimidazolone | bluish-red |
| [structure: 4-methyl-6-amino-7-chloro-2-hydroxyquinoline] | 5-acetocetylaminobenzimidazolone | yellow |
| [structure: 4-methyl-6-amino-7-chloro-2-hydroxyquinoline] | 5-(2'-Hydroxy-3'-naphthoylamino)-7-chlorobenzimidazolone | bluish red |
| [structure: 4-methyl-5-methoxy-6-amino-8-methoxy-2-hydroxyquinoline] | 5-Acetoacetylaminobenzimidazolone | reddish yellow |
| " | 5-(2'-Hydroxy-3'-naphthoylamino)-benzimidazolone | bluish red |
| [structure: 4-methyl-6-amino-8-chloro-2-hydroxyquinoline] | 7-Chloro-5-acetoacetylaminobenzimidazolone | yellow |
| [structure: 4-methyl-5-chloro-6-amino-8-methoxy-2-hydroxyquinoline] | 5-Acetoacetylaminobenzimidazolone | yellow |
| " | 7-Chlor-5-acetoacetylaminobenzimidazolone | yellow |
| [structure: 4,6-dimethyl-7-amino-2-hydroxyquinoline] | 5-Acetoacetylaminobenzimidazolone | yellow |
| " | 7-Chloro-5-acetoacetylamino-benzimidazolone | yellow |
| [structure: 4-methyl-6-methoxy-7-amino-2-hydroxyquinoline] | 5-Acetoacetylaminobenzimidazolone | reddish yellow |
| " | 7-Chloro-5-acetoacetylamino-benzimidazolone | reddish yellow |

| Diazo component | Coupling component | Shade |
|---|---|---|
| (structure) | 5-(2'-Hydroxy-3-naphthoyl(amino)-benzimidazolone | bluish red |
| (structure) | 7-Chloro-5-acetoacetylaminobenzimidazolone | yellow |
| (structure) | 5-Acetoacetylaminobenzimidazolone | yellow |
| (structure) | 5-Acetoacetylaminobenzimidazolone | yellow |

We claim:

1. A monoazo dyestuff of the formula

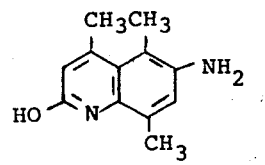

wherein $R_1$, $R_2$ and $R_3$ each are hydrogen, alkyl with 1–4 carbon atoms, alkoxy with 1–4 carbon atoms, chlorine or bromine, X is hydrogen, chlorine or bromine and A is acetoacetyl.

2. A monoazo dyestuff according to claim 1, wherein $R_1$, $R_2$ and $R_3$ each are hydrogen, methyl, ethyl, methoxy, ethoxy or chlorine, X is hydrogen or chlorine.

3. A monoazo dyestuff of the formula

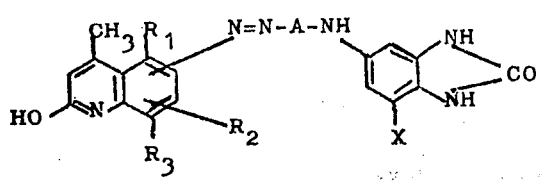

4. A monoazo dyestuff of the formula

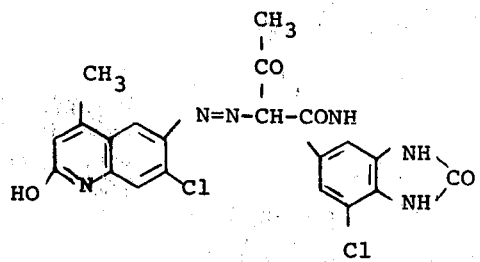

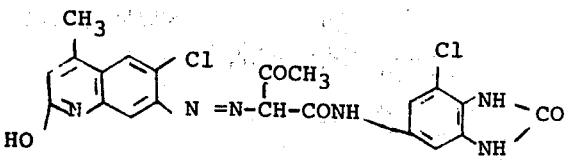

5. A monoazo dyestuff of the formula

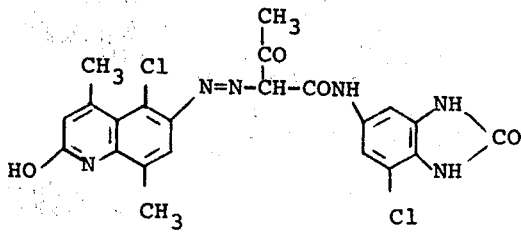

* * * * *